(12) United States Patent
Hiertz et al.

(10) Patent No.: US 11,490,420 B2
(45) Date of Patent: Nov. 1, 2022

(54) CONTENTION-BASED MULTI-LAYER TRANSMISSION

(71) Applicant: Telefonaktiebolaget LM Ericsson (publ), Stockholm (SE)

(72) Inventors: Guido Roland Hiertz, Aachen (DE); Miguel Lopez, Solna (SE); Charlie Pettersson, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 660 days.

(21) Appl. No.: 16/341,262

(22) PCT Filed: Jan. 30, 2019

(86) PCT No.: PCT/EP2019/052288
§ 371 (c)(1),
(2) Date: Apr. 11, 2019

(87) PCT Pub. No.: WO2020/156665
PCT Pub. Date: Aug. 6, 2020

(65) Prior Publication Data
US 2021/0345402 A1   Nov. 4, 2021

(51) Int. Cl.
*H04W 74/00* (2009.01)
*H04W 74/08* (2009.01)
*H04W 48/18* (2009.01)
*H04W 72/04* (2009.01)
*H04W 72/12* (2009.01)

(52) U.S. Cl.
CPC ....... *H04W 74/0816* (2013.01); *H04W 48/18* (2013.01); *H04W 72/0453* (2013.01); *H04W 72/1242* (2013.01); *H04W 72/1263* (2013.01)

(58) Field of Classification Search
None
See application file for complete search history.

(56) References Cited

U.S. PATENT DOCUMENTS

| 2011/0194644 A1* | 8/2011 | Liu | H04L 5/0023 375/295 |
| 2012/0008490 A1* | 1/2012 | Zhu | H04B 7/0452 370/216 |

(Continued)

FOREIGN PATENT DOCUMENTS

| RU | 2569569 C2 | 11/2015 |
| WO | 2015031439 A1 | 3/2015 |
| WO | 2018017187 A1 | 1/2018 |

OTHER PUBLICATIONS

IEEE 802.11e, IEEE Standard for Information technology—Telecommunications and information exchange between systems—Local and metropolitan area networks—Specific requirements, "Part 11: Wireless LAN Medium Access Control (MAC) and Physical Layer (PHY) specifications: Amendment 8: Medium Access Control (MAC) Quality of Service Enhancements," Nov. 2005, 211 pages.

(Continued)

*Primary Examiner* — Ajit Patel
*Assistant Examiner* — Pamit Kaur
(74) *Attorney, Agent, or Firm* — Sage Patent Group

(57) ABSTRACT

A technique for performing a multi-layer transmission of data on a radio frequency is described. The multi-layer transmission comprising multiple layers each having a different robustness on the radio frequency. As to a method aspect of the technique, a contention procedure is performed with respect to each of a plurality of access classes, ACs, for accessing the radio frequency. The multi-layer transmission is performed upon success of the contention procedure of at least one of the ACs. In a transmission opportunity defined by the successful contention procedure, data associated with the successful AC is transmitted on a main layer of the multi-layer transmission simultaneously with data associ- (Continued)

ated with at least one further AC on at least one further layer, which is less robust than the main layer of the multi-layer transmission.

24 Claims, 8 Drawing Sheets

(56) References Cited

U.S. PATENT DOCUMENTS

| | | | |
|---|---|---|---|
| 2014/0079046 A1 | 3/2014 | Yang et al. | |
| 2015/0139120 A1* | 5/2015 | ElArabawy | H04L 5/0037 370/329 |
| 2021/0281367 A1* | 9/2021 | Zhang | H04L 1/1825 |

OTHER PUBLICATIONS

IEEE-802.11, IEEE Standard for Information technology—Telecommunications and information exchange between systems—Local and metropolitan area networks—Specific requirements, "Part 11: Wireless LAN Medium Access Control (MAC) and Physical Layer (PHY) Specifications," 2016, 3534 pages.

Related PCT Application No. PCT/EP2018/058571 as filed on Apr. 4, 2018 titled "Technique for Radio Transmission Under Varying Channel Conditions," (not yet published) 67 pages.

Notification of Transmittal of the International Search Report and the Written Opinion of the International Searching Authority for International Application No. PCT/EP2019/052288 dated Oct. 1, 2019.

Charfi et al., "Upcoming WLANs MAC access mechanisms: an overview," 8th International Symposium on Communications Systems, Networks & Digital Signal Processing (CSNDSP), 2012, IEEE, Jul. 18, 2012, pp. 1-6.

Yalcin et al., "Maximum-weight scheduling with hierarchical modulation for lower delay," International Journal of Electronics and Communications (AEÜ), vol. 70, No. 9, Jun. 15, 2016, pp. 1205-1210.

Decision to Grant dated Mar. 23, 2022 for Russian Patent Application No. 2021121309, 23 pages. (English translation included).

Search Report dated Mar. 23, 2022 for Russian Patent Application No. 2021121309, 4 pages. (English translation included).

* cited by examiner

CONTENTION-BASED MULTI-LAYER TRANSMISSION

CROSS REFERENCE TO RELATED APPLICATION

This application is a 35 U.S.C. § 371 national stage application of PCT International Application No. PCT/EP2019/052288, filed on Jan. 30, 2019, the disclosure and content of which is incorporated by reference herein in its entirety.

TECHNICAL FIELD

The present disclosure relates to a technique for multi-layer radio transmission. More specifically, and without limitation, a method and a device for simultaneously transmitting data on a radio frequency using multiple layers of different robustness are provided.

BACKGROUND

Multi-layer technology allows simultaneously transmitting several messages by sharing modulation symbols, which is used in various wireless communications standards, including Long Term Evolution (LTE) defined by the Third Generation Partnership Group (3GPP) and digital television standards such as Digital Video Broadcasting for Terrestrial transmission (DVB-T) and DVB for Satellite-to-Handheld transmission (DVB-SH). Each layer of the multi-layer transmission is characterized by a level of robustness.

The multi-layer transmission may be implemented using a multiplexer (MUX) and a constellation mapper. The MUX combines several bit streams corresponding to one or more encoded pieces of data, e.g. signaling or user messages. The mapper assigns partial modulation symbols in a hierarchical constellation to groups of bits.

While multi-layer technology enables transmitting various pieces of data simultaneously, the pieces of data may have different priorities, which herein are generically referred to as access classes (ACs). For example, data packets of an e-mail may be assigned a lower access class than those of a voice call.

A simple approach can always transmit data of the highest AC using the most robust modulation symbols. However, as a consequence, data of other ACs would be frequently discarded or lost in the transmission in favor of transmitting the data of one or few high ACs, resulting in an uncontrolled access delay or latency for the other ACs.

This problem becomes even more severe on a shared or unlicensed radio frequency requiring probabilistic time-division multiplexing according to a distributed medium access protocol or listen-before-talk procedure, which herein is generically referred to as a contention procedure. While there are contention procedures supporting different ACs, such as Enhanced Distributed Channel Access (EDCA) for the Wi-Fi standard IEEE 802.11e, current transmission procedures offer no change in robustness between transmitted messages. Hence, the highest AC would additionally block other ACs from accessing the medium, resulting in a further decrease of Quality of Service (QoS) for the other ACs.

SUMMARY

Accordingly, there is a need for improving or controlling Quality of Service when transmitting pieces of data with different QoS in a multi-layer transmission, particularly in terms of latency and in combination with probabilistic time-division multiplexing.

As to a method aspect, a method of performing a multi-layer transmission of data on a radio frequency is provided. The multi-layer transmission comprises multiple layers on the radio frequency. Each of the multiple layers has a different robustness. The method comprises a step of performing a contention procedure with respect to each of a plurality of access classes (ACs) for accessing the radio frequency. The method further comprises a step of performing the multi-layer transmission upon success of the contention procedure of at least one of the ACs.

In a transmission opportunity defined by the successful contention procedure, data associated with the successful AC is transmitted on a main layer of the multi-layer transmission simultaneously with data associated with at least one further AC on at least one further layer of the multi-layer transmission. The at least one further layer is less robust than the main layer of the multi-layer transmission.

The at least one AC for which the contention procedure is successful for the transmission opportunity may also be referred to as successful AC. Any AC for which the contention procedure is not successful (i.e. unsuccessful) for the transmission opportunity defined by the contention procedure of the successful AC may also be referred to as an unsuccessful AC.

The data that is respectively associated with the successful AC and the further AC (or any one of the plurality of ACs) may be a message or any piece of data that is pending for transmission. The message may be a control message or a data message.

Embodiments of the technique can enable flexibly selecting and/or mapping data from respective ACs (e.g., associated with various priorities) to the respective layers, e.g., to robustness-specific sets of modulation symbols. The modulation symbols in different robustness-specific sets may have different robustness in the multi-layer transmission.

Since the successful contention procedure for any one of the plurality of ACs may trigger the multi-layer transmission, latency can be reduced or controlled in at least some embodiments, particularly in combination with probabilistic time-division multiplexing. In same or further embodiments, since the data associated with the successful AC is transmitted on the main layer of the multi-layer transmission, a transmission reliability may be increased or controlled, e.g., for all of the plurality of ACs. For example, the transmission of data associated with one AC is not blocked by another AC, which has data pending for transmission and is higher (e.g., in terms of priority) than the one AC. In other words, the success of the contention procedure for the one AC may enable this AC to transmit its data regardless of whether or not there is a higher (e.g., but unsuccessful) AC having data pending for transmission.

The method may be performed by one or more stations, which may also be referred to as radio devices. One or a plurality of the stations each embodying the technique may perform multi-access with multiple layers.

The radio frequency may be shared among a plurality of stations. Alternatively or in addition, the radio frequency may be in an unlicensed radio spectrum.

The contention procedure may encompass any access mechanism for the radio frequency shared between the plurality of stations. For example, the contention procedure may be a listen before talk (LBT) procedure, or the contention procedure may be implemented by Carrier-Sense Multiple Access with Collision Avoidance (CSMA/CA), e.g., according to the standard family IEEE 802.11, and/or by Enhanced Distributed Channel Access (EDCA), e.g., according to the standard 802.11e.

The transmission opportunity may be any time period in which a station is permitted to transmit, e.g., as a result of the respective contention procedure. For example and without limitation thereto, the transmission opportunity may be a parameter TXOP defined by the standard family IEEE 802.11 and/or 3GPP Release 13 or later.

A data queue may be maintained for each of the plurality of ACs. The data (e.g., one or more messages) associated with the different ACs may be stored (i.e., buffered or queued) in the respective queues.

The method may be performed by one station comprising a plurality of AC entities. Each of the AC entities may be associated with a different one of the ACs. Each AC entity may perform the contention procedure of the respective AC and/or maintain the data queue for the data associated with the respective AC.

The contention procedures performed with respect to different ACs may be performed independently. For example, each of the AC entities may perform an independent contention procedure.

A multi-layer transmission may contain at least two partial modulation symbols each associated with a different layer in terms of a power level or amplitude. The at least two partial modulation symbols may be combined into a modulation symbol that is transmitted in the multi-layer transmission.

A robustness of each of the multiple layers may be defined in terms of its power level or amplitude. For example, the robustness of a given layer may correspond to the (e.g., maximum or minimum) difference between modulation symbols representing different data on the given layer assuming all data on other layers is unchanged. The robustness of a respective layer of the multiple layers may correspond to a power level or amplitude used for the respective layer in the multi-layer transmission. The main layer may be the most robust layer of the multi-layer transmission, optionally with the exception of a layer dedicated to a control signal.

A number of the plurality of ACs may be m. The plurality of m ACs may be those ACs for which there is (e.g., currently) data to be transmitted and/or for which the contention procedure is (e.g., currently) performed.

If the multi-layer transmission comprises n layers or a number of the multiple layers is n, the number of the at least one further AC may be n−1 or less. If m>n, n−1 ACs (other than the successful AC triggering the multi-layer transmission and/or defining the transmission opportunity) or less may be selected to be the at least one further AC.

Each contention procedure of the at least one further AC may be unsuccessful for the transmission opportunity. That is, each of the at least one further ACs may be an unsuccessful AC. Alternatively, if a number of $m_s$ successful ACs for the transmission opportunity among the plurality of m ACs is greater than 1, then $m_s$−1 or less of the further ACs may be successful ACs and/or n−$m_s$ or less of the further ACs may be unsuccessful ACs.

Herein, transmitting data associated with one or more ACs on one or more layers may be briefly referred to as transmitting the one or more ACs on the one or more layers.

The at least one further AC that is transmitted on the at least one further layer of the multi-layer transmission may be randomly selected among the plurality of ACs for which the respective contention procedures are unsuccessful for the transmission opportunity and/or for which data is pending or queued for transmission.

The at least one further layer may be at least two further layers, and the at least one further AC may be at least two further ACs. The at least two further ACs (i.e., the data associated with the at least two further ACs) may be transmitted on the at least two further layers of the multi-layer transmission, respectively.

The at least two further ACs may be randomly mapped to the respective further layers. For example, each of the at least two further ACs may be uniquely mapped to a different one of the at least two further layers.

The at least two further ACs may be selected out of the plurality of ACs, for which the contention procedure is unsuccessful for the transmission opportunity.

The random selection may select each AC, for which the respective contention procedure is unsuccessful for the transmission opportunity, with the same probability. The random selection based on the same probability for each of the unsuccessful ACs may also be referred to as a fair selection among the unsuccessful ACs.

Alternatively or in addition, the random mapping may map each of the at least two further ACs with the same probability to a given further layer. The random mapping based on the same probability for each of the at least two further ACs (e.g., the at least two selected ACs among the unsuccessful ACs) may also be referred to as a fair mapping among the selected ACs.

The random selection may select a first AC with a first probability that is greater than a second probability for selecting a second AC. The at least one AC may be selected among at least two unsuccessful ACs based on a (e.g., higher) priority of the unsuccessful ACs. For example, the first AC may have a greater priority then the second AC. The random selection based on (e.g., pairwisely) different probabilities for selecting the at least two further ACs out of the unsuccessful ACs may also be referred to as a biased selection among the unsuccessful ACs.

Alternatively or in addition, the random mapping may map a first AC with a first probability to a given further layer that is greater than a second probability for mapping a second AC to the given further layer. The random mapping based on (e.g., pairwisely) different probabilities for the at least one or at least two further ACs (e.g., the at least two selected ACs) may also be referred to as a biased mapping.

A first AC of the at least two further ACs may have a first priority and a second AC of the at least two further ACs has a second priority. The first AC may be mapped to a first layer of the further layers, and the second AC may be mapped to a second layer of the further layers. The first priority may be higher than the second priority, and the first layer may be more robust than the second layer.

The first and second priorities of the at least two further ACs may be assigned to the respective further ACs. Alternatively or in addition, the first and second priorities may be defined and/or refined within the respective further AC based on at least one of a layer address and a port number of the data associated with the respective further AC.

The priority may be a rank of the ACs. Each of the plurality of ACs may have a different priority. For example, the priority of the AC may be defined according the EDCA specified by the standard family IEEE 802.11. Alternatively or in addition, the priority of the AC may be defined by a type of bearer and/or Quality of Service (QoS) associated with the data or an underlying service. For example, each type of bearer may be assigned a QoS Class Identifier (QCI), e.g., by a base station. Moreover, the plurality of ACs referred to herein may or may not be related to the "Access Classes" of the 3GPP document TS 22.011, section 4.2, version 16.4.0.

Furthermore, any of the priorities associated with respective ACs may be defined based on a layer address, a port number and/or a socket (e.g., a Portable Operating System Interface socket, POSIX socket) of the data or a service underlying the data. For example, each AC may correspond to a layer address, a port number, a socket and/or a service.

The layer address may refer to an address corresponding to any of the layers in a protocol stack, e.g., of the multi-layer transmission. For example, the layer address may refer to either a network/IP layer or a MAC layer.

A port number (e.g., 5060) associated with a voice service (e.g., a voice over IP, VoIP, service) may be indicative of a first priority that is greater than the priority assigned based on a port number (e.g., 80 or 443) associated with a Hypertext Transfer Protocol (HTTP) or any other Transmission Control Protocol (TCP).

Each contention procedure performed for the respective AC may be based on a back-off counter. The back-off counter may also be referred to as a slot counter.

Each contention procedure may be initialized by randomly drawing a value for the back-off counter from a contention window (CW), e.g., an initial CW. A size and/or a position of the initial contention window may depend on the respective AC.

Each of the plurality of ACs may be assigned respective upper and lower bounds, $CW_{min}$ and $CW_{max}$, for its (e.g., initial) contention window. The contention procedure performed with respect to each of the ACs may be based on the back-off counter. The back-off counter may be randomly drawn from the respective CW. The data associated with different ACs may experience a varying probability to be transmitted, and/or their queuing times vary, according to the respective CW.

If the radio frequency is idle (i.e., unoccupied) for a predefined or configured time period (e.g., a distributed inter-frame spacing, DIFS) the back-off counter may be decremented (e.g., for each slot). The success of the contention procedure may be defined by a vanishing (i.e., zero) back-off counter at the transmission opportunity. The back-off counter on an unsuccessful AC may be positive (e.g., 1 or more) at the transmission opportunity.

At least one of the selection and the mapping may be based on a comparison of values of the respective back-off counters. The priority associated with the respective layers may depend on the back-off counter. For example, a first AC having a first back-off counter may be mapped to a first layer that is more robust than a second layer to which a second AC having a second back-off counter is mapped, if the value of the second back-off counter is greater than the value of the first back-off counter.

Contention procedures performed with respect to two or more ACs may be successful for the same transmission opportunity, i.e., $m_s>1$. The case of two or more successful ACs for the same transmission opportunity may also be referred to as a virtual collision. The data associated with the AC having the highest priority among the successful ACs may be transmitted on the main layer of the multi-layer transmission.

The data associated with an AC having the second-highest priority among the successful ACs may be transmitted on a layer of the multi-layer transmission that is less robust than the main layer and more robust than the at least one further layer (e.g., used for the at least one unsuccessful AC).

For example, the data associated with the highest priority among the successful ACs may be transmitted on the most robust layer of the multi-layer transmission.

The data associated with the second-highest priority among the successful ACs may be transmitted on the most robust but one layer of the multi-layer transmission.

For example, the $m_s$ successful ACs may be mapped to the $m_s$ layers having the highest priority or the $m_s$ layers starting from (and including) the main layer in the order of decreasing priority. The unsuccessful ACs may be mapped to the at least one further layer (e.g., with less priority than the $m_s$ layers) in the order of decreasing priority. The further layers for transmitting the at least one further AC (e.g., the one or more unsuccessful ACs) may be less robust than any of the layers used for transmitting the data associated with the two or more successful ACs.

Among the successful ACs, the priorities of the ACs may increase in the direction of increasing robustness of the respective layers. Alternatively or in addition, among the unsuccessful ACs, the priorities of the ACs may increase in the direction of increasing robustness of the respective layers.

The multi-layer transmission may comprise n layers. The respective contention procedures of $m_s$ ACs (e.g., based on a respective back-off counter) may be successful for the same transmission opportunity. For $m_s>n$, the n ACs having the highest priorities among the $m_s$ successful ACs may be selected for the multi-layer transmission and/or mapped to the respective n layers of the multi-layer transmission.

Alternatively or in addition, for $m_s>n$, the $m_s-n$ ACs having the least priorities among the $m_s$ successful ACs may reinitiate their contention procedures by randomly drawing a value of the back-off counter from their initial contention window. The initial contention window used for the re-initiation may be the same initial contention window used for initiating the respective contention procedure in the first place.

The method may further comprise a step of receiving an acknowledgement frame, e.g., in response to the multi-layer transmission. The acknowledgement frame may be indicative of at least two or each of the multiple layers of the multi-layer transmission. The acknowledgement frame may comprise a Block Acknowledgment (BA).

The acknowledgement frame may relate to all layers (e.g., represented by partial modulation symbols) in one modulation symbol. The multiple layers of the multi-layer transmission may be transmitted in one modulation symbol.

The acknowledgement frame may be indicative of successful or unsuccessful reception of the data transmitted on the respective layers and/or the data associated with the respective ACs. The acknowledgement frame may be indicative of which of the multiple layers of the multi-layer transmission are received successfully. Alternatively or in addition, the acknowledgement frame may be indicative of which partial modulation symbols within the modulation symbol are received successfully.

A control signal may be pending for transmission at the respective station. The control signal may be transmitted on a layer of the multi-layer transmission. The data and the control signal may be simultaneously transmitted in the multi-layer transmission.

The layer used for the transmission of the control signal may be a layer of the multi-layer transmission that is dedicated to the control signal or control signaling in general. In other words, the layer used for the transmission of control signals may be different from other layers (or any layer) used for transmitting the data of any of the ACs.

The layer of the multi-layer transmission on which the control signal is transmitted may be more robust than the main layer. A priority associated with the control signal to be transmitted may be greater than the priority of any of the ACs associated with data to be transmitted.

The control signal may be an acknowledgment (ACK) feedback, e.g., indicative of whether or not a multi-layer reception was successful. Particularly, the transmitted control signal may be an acknowledgment frame comprising any one of the features described for the received acknowledgment frame (e.g., independent of whether or not an acknowledgment frame is received).

Moreover, the method aspect may be performed at or by a transmitting station (briefly: transmitter). The transmitting station may be a base station, e.g., for a downlink or a backhaul link using the radio frequency. Alternatively or in addition, the transmitting station may be a radio device, e.g., for an uplink or a sidelink using the radio frequency. The data (and, optionally, the control signal) may be multi-layer transmitted to a receiving station (briefly: receiver). The receiving station may be a base station, e.g., terminating the backhaul link or the uplink. Alternatively or in addition, the receiving station may be a radio device, e.g., terminating the downlink or the sidelink.

The transmission of the control signal may be delayed or deferred, e.g. due to a command received from another station, e.g., from the receiving station. The command may be indicative of the receiving station being in the process of transmitting data.

The method may further comprise a step of generating the modulation symbol by combining the partial modulation symbols of the respective layers, e.g., in a constellation plane or by superposing in-phase (I) and quadrature (Q) components, respectively, of all partial modulation symbols. The partial modulation symbols may be combined by determining and/or scaling an amplitude of the partial modulation symbol according to a power level of the respective layer. The different power levels may correspond to scaled modulation alphabets or scaled constellation diagrams. Alternatively or in addition, the combining may correspond to modulation alphabets or constellation diagrams shifted in the constellation plane according to the partial modulation symbol of the next higher layer.

The layers may be ordered according to the respective power levels. The amplitude of each pair of consecutive layers may be scaled by a factor of 2 or more. The power of each pair of consecutive layers may be different by a factor of 4 or more and/or the power level of each pair of consecutive layers may be different by 6 dB or more.

A channel used for the multi-layer transmission, e.g., the channel between the transmitting station and the receiving station, may comprise multiple subcarriers (as a frequency domain). The radio frequency may correspond to one of the subcarriers or each of the subcarriers may be an example for the radio frequency.

Alternatively, or in addition, the channel may comprise one or more slots or transmission time intervals (TTIs). Each slot or TTI may comprise one or a plurality of modulation symbols (as a time domain). Alternatively, or in addition, the channel may comprise a directional transmission (also: beamforming transmission) at the transmitting station, a directional reception (also: beamforming reception) at the receiving station or a multiple-input multiple-output (MIMO) channel with two or more spatial streams (as a spatial domain). The method or at least the multi-layer transmission may be performed for each of the subcarriers, the slots, TTIs or modulation symbols, and/or the spatial streams.

The channel may be subjected to at least one of noise and interference. The power levels may be controlled or determined depending on an average power of at least one of the noise and the interference. For example, the average power of at least one of the noise and the interference may vary over a duration of the modulation symbol by the least power level of the different power levels or more.

The transmitting station and the receiving station may be spaced apart. The transmitting station and the receiving station may be in data and control signal communication exclusively by means of radio communication, e.g., including the channel or the multi-layer transmission on the radio frequency.

The transmitting station and/or the receiving station may form, or may be part of, a radio network, e.g., according to the Third Generation Partnership Project (3GPP) or according to the standard family IEEE 802.11 (Wi-Fi). The method aspect may be performed by one or more embodiments of the transmitting station in the radio network. The radio network may be a radio access network (RAN) comprising one or more base stations, e.g., acting as the transmitting or receiving station. Alternatively, or in addition, the radio network may be a vehicular, ad hoc and/or mesh network comprising two or more radio devices, e.g., acting as the transmitting and receiving stations.

Any of the radio devices may be a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Any of the radio devices may be wirelessly connected or connectable (e.g., according to a radio resource control, RRC, state or active mode) with any of the base stations. The base station may encompass any station that is configured to provide radio access to any of the radio devices. The base stations may also be referred to as transmission and reception point (TRP), radio access node or access point (AP). The base station or one of the radio devices functioning as a gateway (e.g., between the radio network and the RAN and/or the Internet) may provide a data link to a host computer providing the data associated to at least one of the ACs. Examples for the base stations may include a 3G base station or Node B, 4G base station or eNodeB, a 5G base station or gNodeB, a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the method may be encoded in a Field-Programmable Gate Array (FPGA) and/or an Application-Specific Integrated Circuit (ASIC), or the functionality may be provided for download by means of a hardware description language.

As to a device aspect, a device for performing a multi-layer transmission of data on a radio frequency is provided. The device may be configured to perform any one of the steps of the method aspect.

As to a further device aspect, a device for performing a multi-layer transmission is provided. The device comprises at least one processor and a memory. Said memory may comprise instructions executable by said at least one processor whereby the device is operative to perform any one of the steps of the method aspect.

As to a still further aspect a communication system including a host computer is provided. The host computer comprises a processing circuitry configured to provide user data, e.g., included in the data of the multi-layer transmission. The host computer further comprises a communication interface configured to forward the user data to a cellular network (e.g., the RAN and/or the base station) for transmission to a UE, wherein the UE comprises a radio interface and processing circuitry. A processing circuitry of the cellular network may be configured to execute any one of the steps of the method aspect.

The communication system may further include the UE. Alternatively, or in addition, the cellular network may further include one or more base stations and/or gateways configured to communicate with the UE and/or to provide a data link between the UE and the host computer using the method aspect.

The processing circuitry of the host computer may be configured to execute a host application, thereby providing the user data and/or any host computer functionality described herein. Alternatively, or in addition, the processing circuitry of the UE may be configured to execute a client application associated with the host application.

Any one of the devices, the UE, the base station, the communication system or any node or station for embodying the technique may further include any feature disclosed in the context of the method aspect, and vice versa. Particularly, any one of the units and modules disclosed herein may be configured to perform or initiate one or more of the steps of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a Wireless Local Area Network (WLAN) implementation according to the standard family IEEE 802.11, it is readily apparent that the technique described herein may also be implemented for any other radio communication technique, including a New Radio (NR) or 5G implementation, 3GPP LTE (e.g., LTE-Advanced or a related radio access technique such as MulteFire), for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
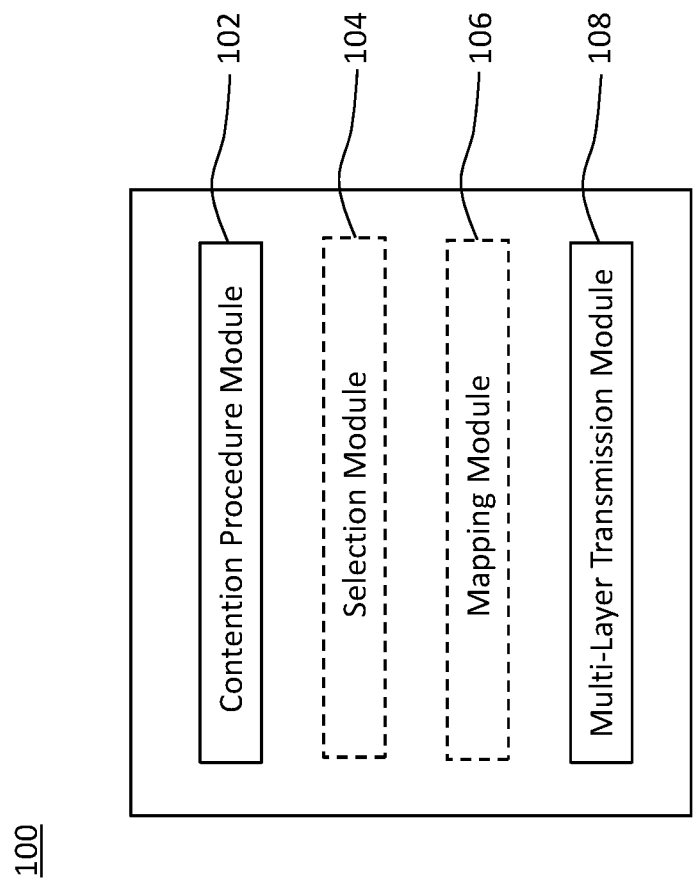
FIG. 1 shows a schematic block diagram of an embodiment of a device for performing a multi-layer transmission.

FIG. 1 schematically illustrates a block diagram of an embodiment of a device for performing a multi-layer transmission of data. The multi-layer transmission comprises multiple layers on a radio frequency. Each of the multiple layers has a different robustness. The device is generically referred to by reference sign 100.

The device 100 comprises a contention procedure module 102 that performs a contention procedure with respect to each of a plurality of ACs for accessing the shared radio frequency. The device 100 further comprises a multi-layer transmission module 108 that performs a multi-layer transmission upon success of the contention procedure of at least one of the ACs. Data associated with the successful AC, i.e. the AC that gained a transmission opportunity by the success of the respective contention procedure, is transmitted in the transmission opportunity on a main layer of the multi-layer transmission simultaneously (i.e., in the same transmission opportunity) with data associated with at least one further AC. The data associated with the at least one further AC is transmitted on at least one further layer of the multi-layer transmission, which is less robust than the main layer of the multi-layer transmission. For example, the at least one further AC may correspond to an unsuccessful AC, i.e. an AC that has not yet gained a transmission opportunity.

Optionally, the device 100 comprises a selection module 104, which selects one or more further ACs among the plurality of unsuccessful ACs for transmission on further layers, which are less robust than the main layer. Alternatively or in addition, the device 100 optionally comprises a mapping module 106, which maps all or the selected one or more further ACs (also: selected set of further ACs) to further layers of the multi-layer transmission.

Any of the modules of the transmitting device 100 may be implemented by units configured to provide the corresponding functionality.

The device 100 may also be referred to as, or may be embodied by, a transmitting station (or briefly: transmitter). The device 100 and a receiving station are in a radio communication at least for the data transmission from the device 100 to the receiving station.

Figure 2:
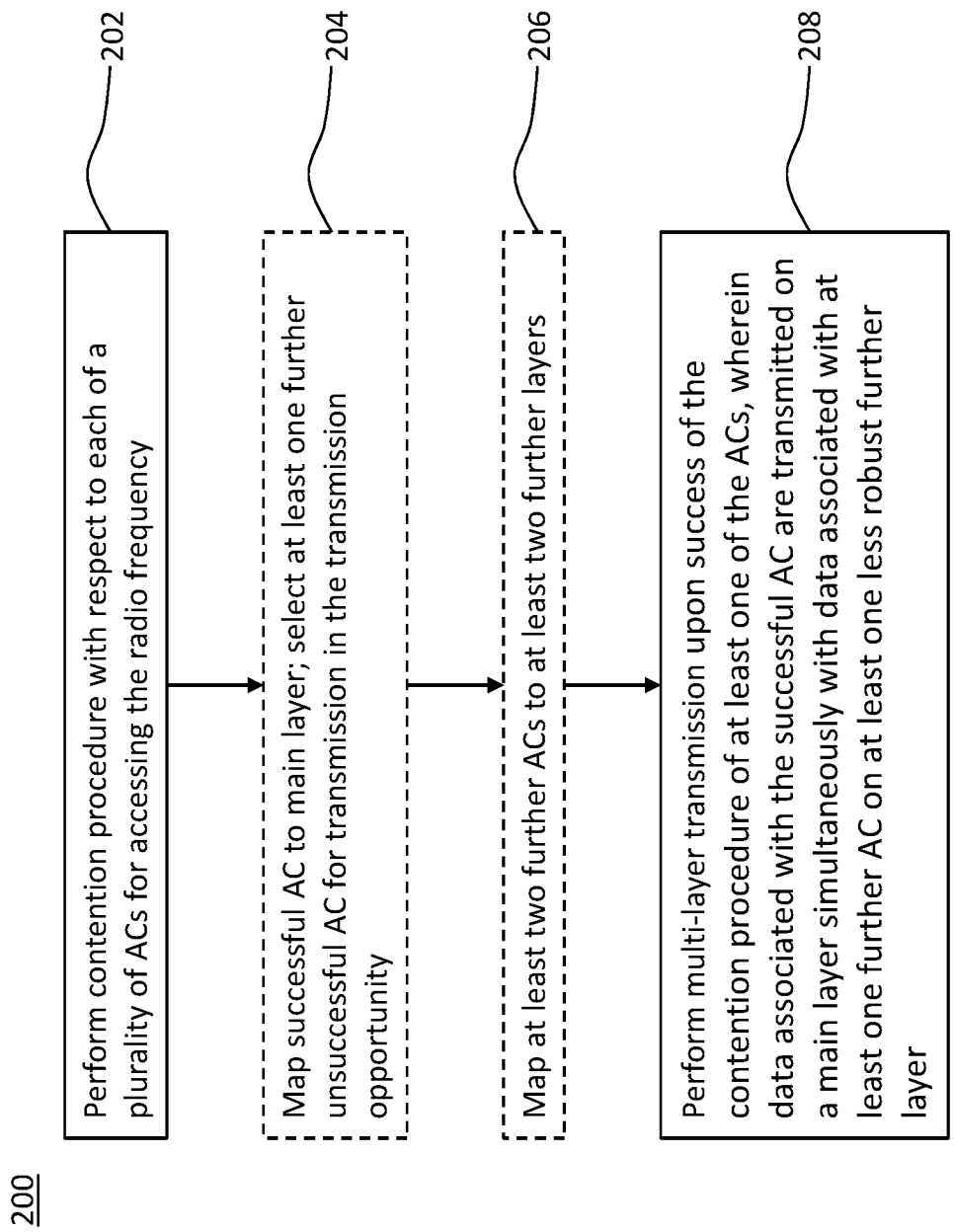
FIG. 2 shows a flowchart for a method of performing a multi-layer transmission, which method may be implementable by the device of FIG. 1.

FIG. 2 shows an example flowchart for a method 200 of performing a multi-layer transmission of data on a radio frequency. The multi-layer transmission comprises multiple layers each having a different robustness on the radio frequency. The method 200 comprises or initiates a step 202 of performing a contention procedure with respect to each of a plurality of ACs for accessing the radio frequency. The method 200 further comprises or initiates a step 208 of performing the multi-layer transmission upon success of the contention procedure of at least one of the ACs. Data associated with the successful AC is transmitted on the main layer of the multi-layer transmission simultaneously with data associated with at least one further AC on at least one further layer. Each of the at least one further layer is less robust than the main layer of the multi-layer transmission. Each of the at least one further AC may correspond to an unsuccessful AC.

Optionally, the method 200 further comprises or initiates a step 204 of selecting further ACs among the plurality of unsuccessful ACs for the multi-layer transmission. Alternatively or in addition, the method 200 comprises an optional step 206 of mapping all or the selected subset of unsuccessful ACs to the further layers of the multi-layer transmission, which are less robust than the main layer.

The method 200 may be performed by the device 100. For example, the modules 102, 104, 106 and 108 may perform the steps 202, 204, 206 and 208, respectively.

The technique may be applied to uplink (UL), downlink (DL) or direct communications between radio devices, e.g., device-to-device (D2D) communications or sidelink (SL) communications.

The device 100 may be a radio device or a base station. Herein, any radio device may be a mobile or portable station and/or any radio device wirelessly connectable to a base station or RAN, or to another radio device. For example, the radio device may be a user equipment (UE), a device for machine-type communication (MTC) or a device for (e.g., narrowband) Internet of Things (IoT). Two or more radio devices may be configured to wirelessly connect to each other, e.g., in an ad hoc radio network or via a 3GPP SL connection. Furthermore, any base station may be a station providing radio access, may be part of a radio access network (RAN) and/or may be a node connected to the RAN for controlling radio access. For example, the base station may be an access point, for example a Wi-Fi access point.

In an exemplary implementation of the method 200, the data (e.g. messages) is stored in a plurality of AC queues of the respective ACs. The ACs or the corresponding data are selected and/or mapped to the multiple layers of the multi-layer transmission.

The contention procedures performed according to the step 202 of the method 200 may be collectively referred to as a contention process. Optionally, the contention process comprises a contention among the plurality of ACs for access to a wireless medium comprising at least the radio frequency. For example, if there is only one successful contention procedure for the transmission opportunity, the corresponding successful AC may be the AC that won the contention process. If more than one AC is successful for the transmission opportunity, the contention within the device 100 may be resolved by a device-internal contention resolution (e.g., prior to the multi-layer transmission), resulting in one of the successful ACs that won the contention process. In any case, the AC that won the contention process may be mapped to the main layer for the transmission opportunity. In other words, data associated with the AC that won the contention process may be transmitted on the main layer of the multi-layer transmission.

The main layer, e.g. the most robust layer, of the multi-layer transmission is assigned to the AC that won the contention process, e.g. by performing a successful contention procedure. One or more of the ACs that lost the contention process, e.g. because their contention procedure did not succeed for the transmission opportunity, are assigned to layers of the multi-layer transmission, which are less robust than the main layer.

While the multi-layer transmission 208 is described for one modulation symbol resulting from the combination of partial modulation symbols, in any embodiment the multi-layer transmission 208 may comprise a plurality of such modulation symbols in the transmission opportunity (e.g., in one TTI). The selection and/or the mapping may be determined once for the transmission opportunity and/or maintained for the entire transmission opportunity. For example a multi-layer packet may be transmitted in step 208 of the method 200. Thus, each modulation symbol or each multi-layer packet can comprise data from two or more ACs.

The contention processes 202 may be implemented using a distributed medium access scheme. In the following embodiments, the distributed medium access scheme supports multiple different priorities. The Enhanced Distributed Channel Access (EDCA) of the Wi-Fi standard IEEE 802.11e is one example of such medium access schemes. For clarity and conciseness, without loss of generality, four different priorities or corresponding ACs, e.g., as described for the EDCA, are supported and implemented in following embodiments. Since the ACs correspond to priorities, the priorities are referred as the access classes (ACs, or access categories). The plurality of ACs may comprise at least one of the following ACs: an AC Voice (AC_VO), e.g., for voice over IP packets; an AC Video (AC_VI), e.g., for a video stream; an AC Best Effort (AC_BE), e.g., for an unspecified variable bit rate, latency and/or packet loss depending on current traffic load; and an AC Background (AC_BK), e.g., for a data synchronization. The ACs are sorted by the priority, e.g., with AC_VO denoting the highest and AC_BK denoting the lowest priority (in the afore-mentioned order).

When the device 100 has data (e.g. messages) queued in two or more of the ACs, one embodiment of the device 100 may choose to transmit the data from more than one queue once the device 100 has gained access to the radio frequency or wireless medium (radio channel) according to the step 208. With multi-layer transmissions 208, the device 100 may apply a static mapping that assigns high-priority data (e.g. control messages) to robust partial modulation symbols and low-priority data (e.g. user data messages) to less robust partial modulation symbols.

Using the static mapping can discriminate the low-priority data (e.g., low-priority messages). Therefore, another embodiment avoids drawbacks for low-priority data. Distributed, multi-priority medium access schemes like EDCA foresee virtual contention between multiple priorities. In EDCA, each AC competes on its own for access to the radio frequency or wireless medium. Thus, each AC operates its own set of medium access parameters, e.g. its contention window size and position, according to the step 202. For example, the range of the contention window of the highest priority AC_VO may extend from $CW_{min}=3$ to $CW_{max}=7$, whereas the range of the lowest priority AC_BK may range from $CW_{min}=15$ to $CW_{max}=1023$. On average, higher priority ACs achieve higher probability to gain access to the wireless medium.

For clarity and concreteness, without any loss of generality, in the following IEEE 802.11 terminology is used, and the access to the shared radio frequency or wireless medium is denoted as a Transmission Opportunity (TXOP). A TXOP defines a point in time and a duration that an AC is permitted to make use of the radio frequency or wireless medium. Multi-layer technology enables simultaneous transmission of multiple pieces of data (e.g. messages) during one TXOP. Unlike with Multi-User Multiple-Input Multiple-Output (MU-MIMO) or Orthogonal Frequency-Division Multiple Access (OFDMA), no central scheduling is needed. In an embodiment, which is combinable with any of the afore-mentioned embodiments, a piece of data (e.g. a message) of the AC having acquired a TXOP is mapped to the main layer (e.g., the most robust layer). That is, one or more partial modulation symbol on the main layer (also: main partial modulation symbols) represent said piece of data. The pieces of data (e.g., messages) of other ACs are mapped to less robust layers. That is, one or more partial modulation symbols, which are less robust than the main partial modulation symbols, represent said pieces of data.

Figure 3:
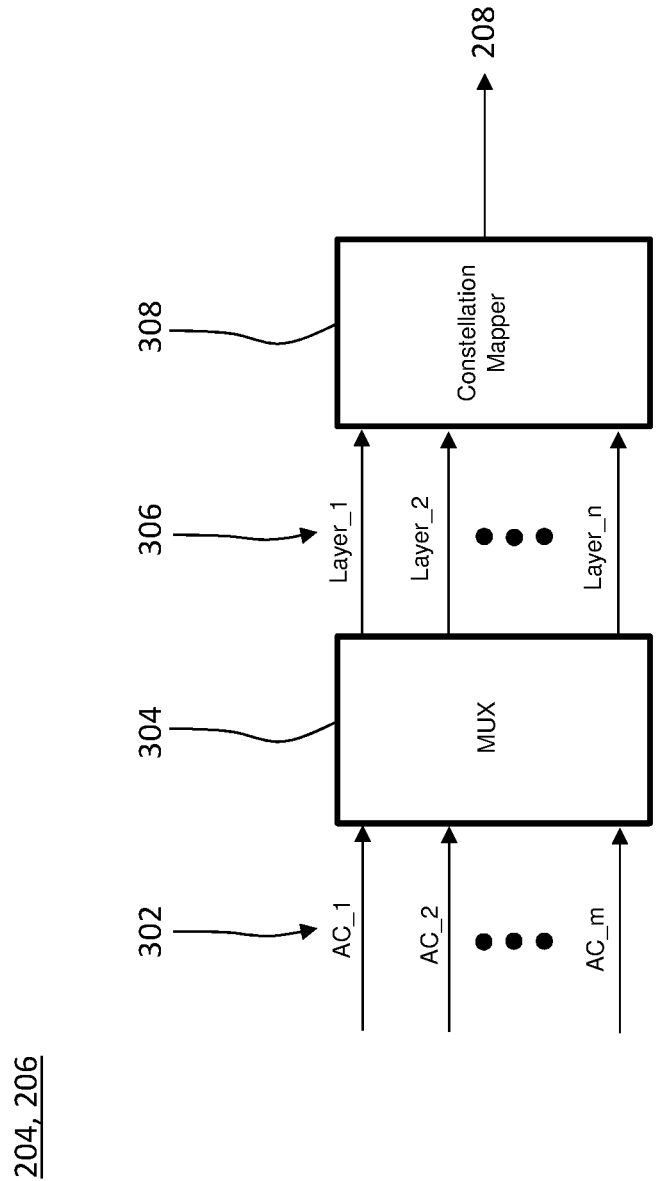
FIG. 3 schematically illustrates an exemplary embodiment, in which a multiplexer maps a number of data streams associated with ACs to layers and a constellation mapper hierarchically structures the layers for transmission.

FIG. 3 schematically illustrates an implementation of the mapping of ACs to layers according to the step 204 and/or the step 206. In the implementation schematically illustrated in FIG. 3, data streams associated with a plurality of m ACs 302, respectively, arrive at a multiplexer (MUX) 304. The MUX 304 maps all or a selected subset of the data (e.g., all or a selected subset of the ACs 302) to n layers 306 (e.g., to n partial modulation symbols per modulation symbol). The constellation mapper 308 combines the n layers 306 (e.g., the n partial modulation symbols per modulation symbol) into the modulation symbol (e.g., the respective modulation symbol in a sequence of modulation symbols during the TXOP) of the multi-layer transmission 208.

Depending on which of the m ACs 302 gained the TXOP (i.e., which of the m ACs 302 is the successful AC) and/or depending on a type of rules applied for mapping the other m−1 ACs, the MUX 304 maps the successful AC to the main layer (e.g., the most robust layer) and all or a subset of the other m−1 ACs to at most n−1 further layers (e.g., with varying robustness).

The robustness variances of the further ACs may result from taking advantage of the mapping (e.g., Gray mapping) of different partial modulation symbols, e.g., using multi-layer transmissions or any other method.

In one implementation, some bits in the constellation of a Gray-mapped quadrature amplitude modulation (QAM) are more robust than others. Thus, bits corresponding to a first piece of data (e.g. a first message) can be mapped to more robust partial modulation symbols (e.g., a first bit group in the Gray-mapped QAM symbols), while bits corresponding to a second piece of data (e.g. a second message) can be mapped to less robust partial modulation symbols (e.g., a second bit group in the Gray-mapped QAM symbols).

In another implementation, the different robustnesses of the different layers may be implemented by superposition of the multiple partial modulation symbols at different power levels, respectively.

The constellation mapper 308 takes in the data streams from these layers 306 and hierarchically structures them for the multi-layer transmission 208.

The MUX 306 allocates at most n of the m ACs 302 to the different partial modulation symbols or layers 306. If pieces of data are queued in more ACs 302 than layers 306 available for the multi-layer transmission, i.e. m>n, then the MUX 304 selects a (e.g., proper) subset of the ACs 302, the associated data of which may be transmitted in the TXOP according to the step 208. It may also be the case that less ACs 302 (e.g. only one AC 302) have data queued for transmission 208 than the number of layers 306 available, i.e. m<n. All n layers 306 may then be filled with data (e.g. messages) from the m ACs 302, e.g. for m=1.

If, for example, the AC 302 operating AC_BK succeeds in the contention procedure and/or gains access to the radio frequency or wireless medium, its data (e.g. messages) receive preferential treatment through being mapped to more robust partial modulation symbols. At the same time, less robust partial modulation symbols may be used to concurrently transmit messages queued in AC_VO.

The mapping of data (e.g. messages) from ACs 302 that did not succeed in the contention procedure for the TXOP may be performed according to the following rules as presented in the various, mutually consistent embodiments. An AC 302 that did not gain the TXOP may also be denoted as unsuccessful AC 302.

In a first class of embodiments, a random selection decides which layers are used with which unsuccessful AC 302. The selection can be fair or biased.

In a first embodiment of the first class of embodiments, which may be denoted as fair selection, all unsuccessful ACs have the same probability of being assigned to a given layer, which is less robust than the main layer assigned to the successful AC.

In a second embodiment of the first class of embodiments, which may be denoted as biased selection, one unsuccessful AC may have higher probability than another unsuccessful AC of being assigned to a given layer, which is less robust than the main layer assigned to the successful AC.

In a second class of embodiments, which may be combinable with embodiments in the first class, the mapping 206 of data from ACs 302 to more or less robust layers 306 of the multi-layer transmission 208 depends on medium access parameters of the data.

In a first embodiment of the second class of embodiments, data (e.g. messages) associated to higher priority ACs 302 is mapped to more robust layers 306 than data (e.g. messages) from lower priority ACs 302, which is mapped to less robust layers 306.

In a second embodiment of the second class of embodiments, data (e.g., messages) are mapped to more or less robust layers 306 according to higher layer addresses and/or port numbers. For example, a port number (e.g., 5060) associated with a voice service (e.g., a voice over IP, VoIP, service) may indicate a higher priority than a port number (e.g., 80 or 443) of a Hypertext Transfer Protocol (HTTP) or any other Transmission Control Protocol (TCP). In a further example, different pieces of data within a given AC 302 may be arranged according to port numbers. E.g., within AC_VO, data arriving through port number 5061 assigned to encrypted Session Initiation Protocol (SIP) may be mapped to a more robust layer 306 than data arriving through port number 5060 assigned to clear text SIP.

According to a third class of embodiments, which may be combinable with the first and/or second class of embodiments, ACs 302 are mapped to layers 306 of the multi-layer transmission 208 according to the values of their back-off counters. A back-off counter may be alternatively denoted as slot counter. With EDCA-like protocols, ACs 302 use a value of the back-off counter randomly drawn from a contention window associated to the respective AC 302. The value of the back-off counter is decremented for every period that the shared radio frequency or wireless medium is sensed as unoccupied. In an embodiment, unsuccessful ACs 302 are mapped to partial modulation symbols or layers 306, which are less robust than the main layer, according to the value of their back-off counter.

Another class of embodiments, which may be combinable with any of the previous classes of embodiments, relates to the handling of device-internal collisions, also denoted as virtual collisions. For example, with EDCA and similar protocols, and with reference to FIG. 4, ACs 302 independently compete 402 for gaining access to the radio frequency or wireless medium. Because of EDCA's contention-based access, the multiple ACs 302 may attempt to acquire a TXOP at the same time. In the standard family IEEE 802.11, such simultaneous attempts are conventionally denoted as collision. A conventional collision occurs, if ACs of different or independent devices transmit simultaneously. If ACs 302 in the same device 100 attempt to acquire a TXOP simultaneously, a device-internal collision may occur. This is denoted as virtual collision at reference sign 404 in FIG. 4. Further referring to FIG. 4, if no virtual collision occurs for a TXOP, data associated with the one AC that succeeds 406 is mapped to the main layer (e.g. the most robust) in the step 408, which may be an example for the step 204.

For clarification, and without limitation thereto, for example the standard family IEEE 802.11 resolves a (e.g., virtual) collision by granting the higher-priority AC 302 with the TXOP and forcing the lower-priority AC 302 to defer. In the multi-layer transmission 208, data (e.g., messages) from a colliding, lower-priority AC 302 may be transmitted concurrently on one or more less robust partial modulation symbols or layers during the same TXOP.

Figure 4:
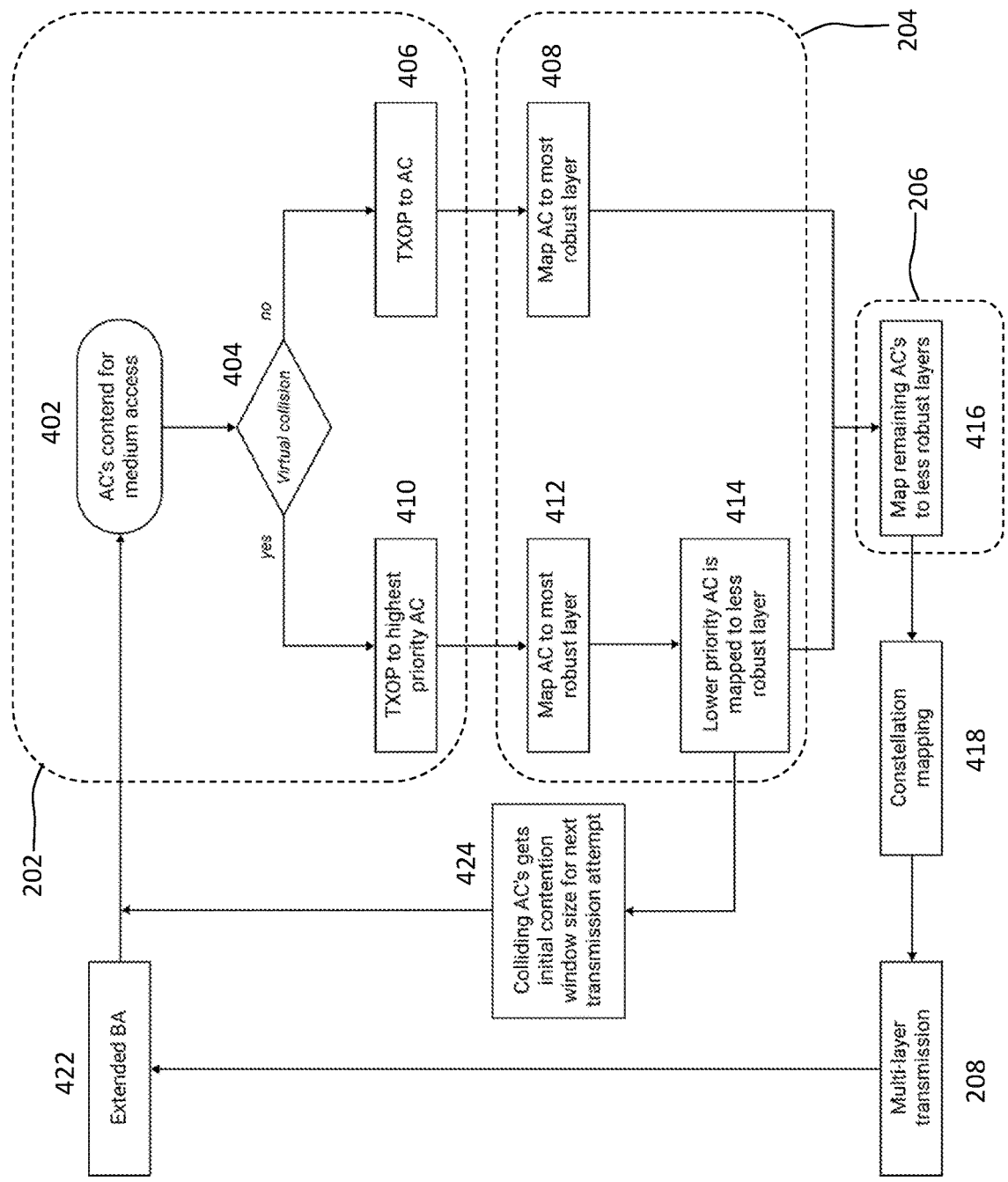
FIG. 4 shows a flowchart for an exemplary implementation of the method of FIG. 2, optionally in the presence of virtual collisions.

With reference to FIG. 4, in a further embodiment, which can be combined with any of the previous embodiments, the colliding ACs 302 are not forced into a deferral state, if by means of the multi-layer transmission 208 their data (e.g., messages) are transmitted concurrently (e.g., and successfully acknowledged by the recipient, e.g. the receiving station). In this case, the highest-priority AC 302 among the successful ACs 302 gains the TXOP at reference sign 410 and is mapped to the main layer 306, e.g. the most robust layer, of the multi-layer transmission 208 in the step 412, which may be another example for the step 204. Successful ACs of lower priority are mapped to the at most n−1 remaining less robust layers in the step 414, which may be a further example for the step 204.

If the number n of layers is larger than the number, $m_C$, of colliding ACs 302 (e.g., the number, $m_S$, of successful ACs for the TXOP), n−$m_C$ (>0) unsuccessful ACs 302 may be mapped to the remaining n−$m_C$ less robust layers 306 in a step 416, which may be an example for the step 206. The constellation mapper 308 takes in the data associated to each layer 306 and hierarchically structures them in a step 418 for the multi-layer transmission 208.

In case more ACs perform a successful contention procedures than layers available for mapping, i.e. $m_C$>n, in a still further embodiment combinable with any of the previous embodiments, the remaining $m_C$−n colliding ACs are permitted to start their next transmission attempt by randomly drawing a value for the back-off counter from the initial contention window size at reference sign 424 in FIG. 4, and not from an otherwise enlarged contention window.

In a still further embodiment, which may be combinable with any of the afore-mentioned embodiments, a scheme for a positive acknowledgment (ACK) feedback, e.g. based on EDCA or EDCA-like protocols, may be modified. In the multi-layer transmission 208, several pieces of data (e.g., messages) are being transmitted simultaneously. According to the existing standard family IEEE 802.11, e.g., multiple simultaneously or sequentially transmitted messages are acknowledged using an acknowledgement frame, or so-called Block Acknowledgments (BAs). For clarity and conciseness, and without limitation thereto, the embodiment is described in terms of the standard family IEEE 802.11 in the following.

According to the embodiment, BAs (e.g., from the receiving station) are modified or extended to indicate to the device 100 as the transmitting station which of the simultaneously transmitted pieces of data (e.g., messages) of a multi-layer transmission 208 are received successfully. The extended BA is received in the step 422 of FIG. 4.

In a still further embodiment, which may be combinable with any of the afore-mentioned embodiments, the multi-layer transmission 208 is used to simultaneously transmit control information and data messages. ACK messages (e.g., according to the standard family IEEE 802.11) are an example for the control messages. In the multi-layer transmission 208, the embodiment of the device 100 is capable of acknowledging a previously received message while at the same time transmitting data messages. This combined transmission of data and ACKs or BAs helps improving latency and/or spectral efficiency, since separate periods for data and ACK transmission may be avoided.

Figure 5:
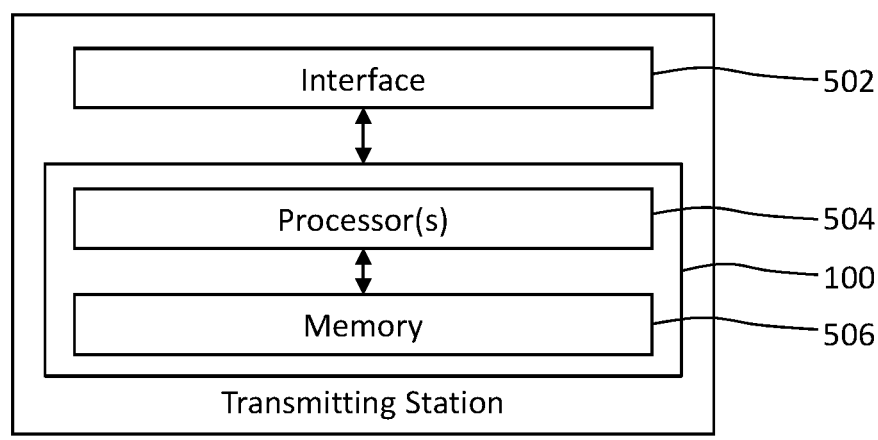
FIG. 5 shows a schematic block diagram of a transmitting station embodying the device of FIG. 1.

FIG. 5 shows a schematic block diagram for an embodiment of the device 100. The device 100 comprises one or more processors 504 for performing the method 200 and memory 506 coupled to the processors 504. For example, the memory 506 may be encoded with instructions that implement at least one of the modules 102, 104, 106 and 108.

The one or more processors 504 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 506, transmitter functionality. For example, the one or more processors 504 may execute instructions stored in the memory 506. Such functionality may include providing various features and steps discussed herein, including any of the benefits disclosed herein. The expression "the device being operative to perform an action" may denote the device 100 being configured to perform the action.

As schematically illustrated in FIG. 5, the device 100 may be embodied by a transmitting station 500, e.g., functioning as a transmitting base station or a transmitting UE. The transmitting station 500 comprises a radio interface 502 coupled to the device 100 for radio communication with one or more receiving stations, e.g., functioning as a receiving base station or a receiving UE.

Figure 6:
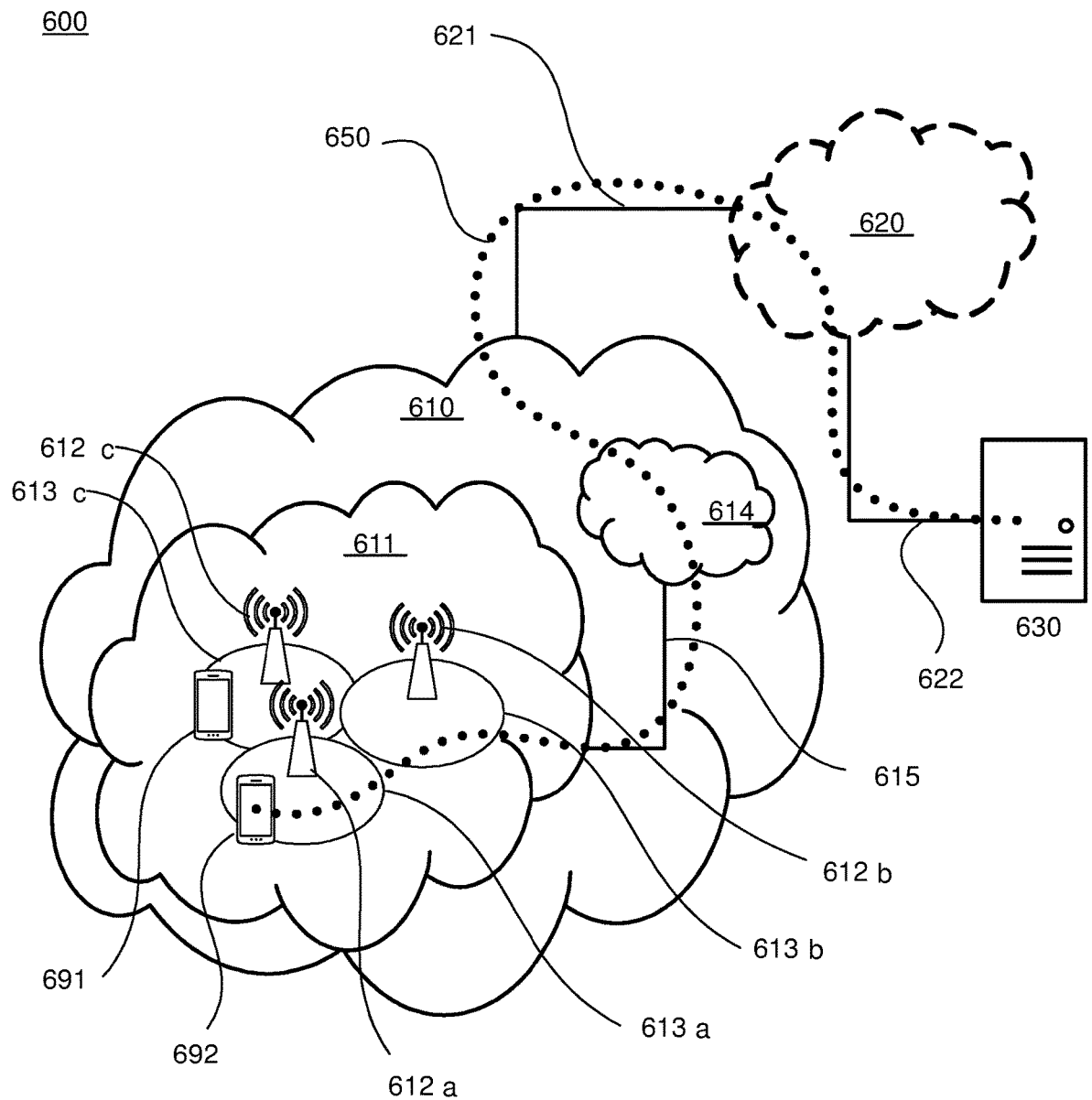
FIG. 6 schematically illustrates an example telecommunication network connected via an intermediate network to a host computer.

With reference to FIG. 6, in accordance with an embodiment, a communication system 600 includes a telecommunication network 610, such as a 3GPP-type cellular network, which comprises an access network 611, such as a radio access network, and a core network 614. The access network 611 comprises a plurality of base stations 612a, 612b, 612c, such as NBs, eNBs, gNBs or other types of wireless access points, each defining a corresponding coverage area 613a, 613b, 613c. Each base station 612a, 612b, 612c is connectable to the core network 614 over a wired or wireless connection 615. A first user equipment (UE) 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example, the disclosed embodiments are equally applicable to a situation where a sole UE is in the coverage area or where a sole UE is connecting to the corresponding base station 612.

Any of the base stations 612 and the UEs 691, 692 may embody the device 100.

The telecommunication network 610 is itself connected to a host computer 630, which may be embodied in the hardware and/or software of a standalone server, a cloud-implemented server, a distributed server or as processing resources in a server farm. The host computer 630 may be under the ownership or control of a service provider, or may be operated by the service provider or on behalf of the service provider. The connections 621, 622 between the telecommunication network 610 and the host computer 630 may extend directly from the core network 614 to the host computer 630 or may go via an optional intermediate network 620. The intermediate network 620 may be one of, or a combination of more than one of, a public, private or hosted network; the intermediate network 620, if any, may be a backbone network or the Internet; in particular, the intermediate network 620 may comprise two or more sub-networks (not shown).

The communication system 600 of FIG. 6 as a whole enables connectivity between one of the connected UEs 691, 692 and the host computer 630. The connectivity may be described as an over-the-top (OTT) connection 650. The host computer 630 and the connected UEs 691, 692 are configured to communicate data and/or signaling via the OTT connection 650, using the access network 611, the core network 614, any intermediate network 620 and possible further infrastructure (not shown) as intermediaries. The OTT connection 650 may be transparent in the sense that the participating communication devices through which the OTT connection 650 passes are unaware of routing of uplink and downlink communications. For example, a base station 612 need not be informed about the past routing of an incoming downlink communication with data originating from a host computer 630 to be forwarded (e.g., handed over) to a connected UE 691. Similarly, the base station 612 need not be aware of the future routing of an outgoing uplink communication originating from the UE 691 towards the host computer 630.

By virtue of the method 200 being performed by any one of the UEs 691 or 692 and/or any one of the base stations 612, the performance of the OTT connection 650 can be improved, e.g., in terms of increased throughput and/or reduced latency. More specifically, the host computer 630 may indicate the AC 302 for the user data being a piece of the data in the multi-layer transmission 208.

Example implementations, in accordance with an embodiment of the UE, base station and host computer discussed in the preceding paragraphs, will now be described with reference to FIG. 7. In a communication system 700, a host computer 710 comprises hardware 715 including a communication interface 716 configured to set up and maintain a wired or wireless connection with an interface of a different communication device of the communication system 700. The host computer 710 further comprises processing circuitry 718, which may have storage and/or processing capabilities. In particular, the processing circuitry 718 may comprise one or more programmable processors, application-specific integrated circuits, field programmable gate arrays or combinations of these (not shown) adapted to execute instructions. The host computer 710 further comprises software 711, which is stored in or accessible by the host computer 710 and executable by the processing circuitry 718. The software 711 includes a host application 712. The host application 712 may be operable to provide a service to a remote user, such as a UE 730 connecting via an OTT connection 750 terminating at the UE 730 and the host computer 710. In providing the service to the remote user, the host application 712 may provide user data, which is transmitted using the OTT connection 750. The user data may depend on the location of the UE 730. The user data may comprise auxiliary information or precision advertisements (also: ads) delivered to the UE 730. The location may be reported by the UE 730 to the host computer, e.g., using the OTT connection 750, and/or by the base station 720, e.g., using a connection 760.

The communication system 700 further includes a base station 720 provided in a telecommunication system and comprising hardware 725 enabling it to communicate with the host computer 710 and with the UE 730. The hardware 725 may include a communication interface 726 for setting up and maintaining a wired or wireless connection with an interface of a different communication device of the communication system 700, as well as a radio interface 727 for setting up and maintaining at least a wireless connection 770 with a UE 730 located in a coverage area (not shown in FIG. 7) served by the base station 720. The communication interface 726 may be configured to facilitate a connection 760 to the host computer 710. The connection 760 may be direct, or it may pass through a core network (not shown in FIG. 7) of the telecommunication system and/or through one or more intermediate networks outside the telecommunication system. In the embodiment shown, the hardware 725 of the base station 720 further includes processing circuitry 728, which may comprise one or more programmable processors, application-specific integrated circuits, field programmable gate arrays or combinations of these (not shown) adapted to execute instructions. The base station 720 further has software 721 stored internally or accessible via an external connection.

The communication system 700 further includes the UE 730 already referred to. Its hardware 735 may include a radio interface 737 configured to set up and maintain a wireless connection 770 with a base station serving a coverage area in which the UE 730 is currently located. The hardware 735 of the UE 730 further includes processing circuitry 738, which may comprise one or more programmable processors, application-specific integrated circuits, field programmable gate arrays or combinations of these (not shown) adapted to execute instructions. The UE 730 further comprises software 731, which is stored in or accessible by the UE 730 and executable by the processing circuitry 738. The software 731 includes a client application 732. The client application 732 may be operable to provide a service to a human or non-human user via the UE 730, with the support of the host computer 710. In the host computer 710, an executing host application 712 may communicate with the executing client application 732 via the OTT connection 750 terminating at the UE 730 and the host computer 710. In providing the service to the user, the client application 732 may receive request data from the host application 712 and provide user data in response to the request data. The OTT connection 750 may transfer both the request data and the user data. The client application 732 may interact with the user to generate the user data that it provides.

Figure 7:
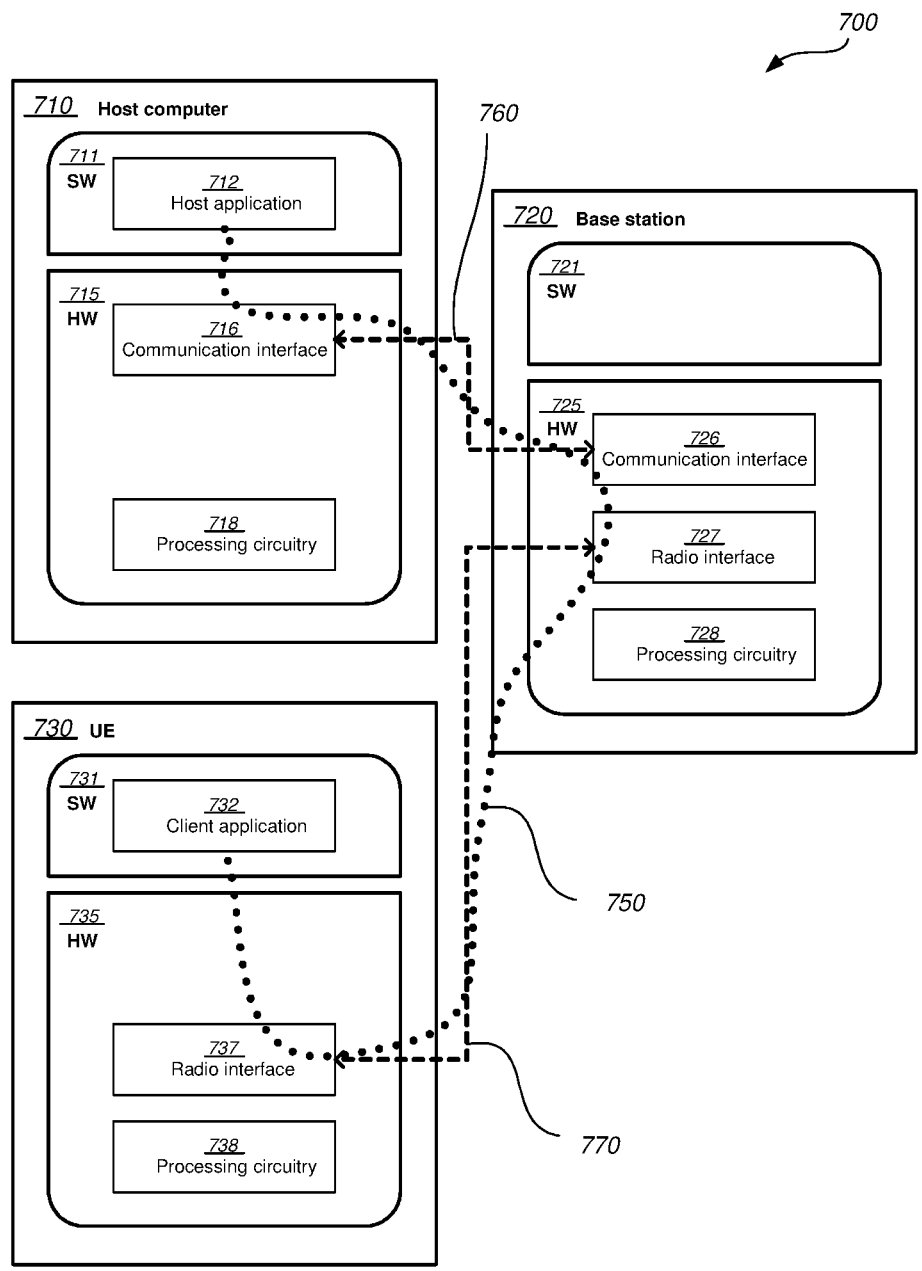
FIG. 7 shows a generalized block diagram of a host computer communicating via a base station or radio device functioning as a gateway with a user equipment over a partially wireless connection.

It is noted that the host computer 710, base station 720 and UE 730 illustrated in FIG. 7 may be identical to the host computer 630, one of the base stations 612a, 612b, 612c and one of the UEs 691, 692 of FIG. 6, respectively. This is to say, the inner workings of these entities may be as shown in FIG. 7, and, independently, the surrounding network topology may be that of FIG. 6.

In FIG. 7, the OTT connection 750 has been drawn abstractly to illustrate the communication between the host computer 710 and the UE 730 via the base station 720, without explicit reference to any intermediary devices and the precise routing of messages via these devices. Network infrastructure may determine the routing, which it may be configured to hide from the UE 730 or from the service provider operating the host computer 710, or both. While the OTT connection 750 is active, the network infrastructure may further take decisions by which it dynamically changes the routing (e.g., on the basis of load balancing consideration or reconfiguration of the network).

The wireless connection 770 between the UE 730 and the base station 720 is in accordance with the teachings of the embodiments described throughout this disclosure. One or more of the various embodiments improve the performance of OTT services provided to the UE 730 using the OTT connection 750, in which the wireless connection 770 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 750 between the host computer 710 and UE 730, in response to variations in the measurement results. The measurement procedure and/or the network functionality for reconfiguring the OTT connection 750 may be implemented in the software 711 of the host computer 710 or in the software 731 of the UE 730, or both. In embodiments, sensors (not shown) may be deployed in or in association with communication devices through which the OTT connection 750 passes; the sensors may participate in the measurement procedure by supplying values of the monitored quantities exemplified above, or supplying values of other physical quantities from which software 711, 731 may compute or estimate the monitored quantities. The reconfiguring of the OTT connection 750 may include message format, retransmission settings, preferred routing etc.; the reconfiguring need not affect the base station 720, and it may be unknown or imperceptible to the base station 720. Such procedures and functionalities may be known and practiced in the art. In certain embodiments, measurements may involve proprietary UE signaling facilitating the host computer's 710 measurements of throughput, propagation times, latency and the like. The measurements may be implemented in that the software 711, 731 causes messages to be transmitted, in particular empty or "dummy" messages, using the OTT connection 750 while it monitors propagation times, errors etc.

Figures 8, 9:
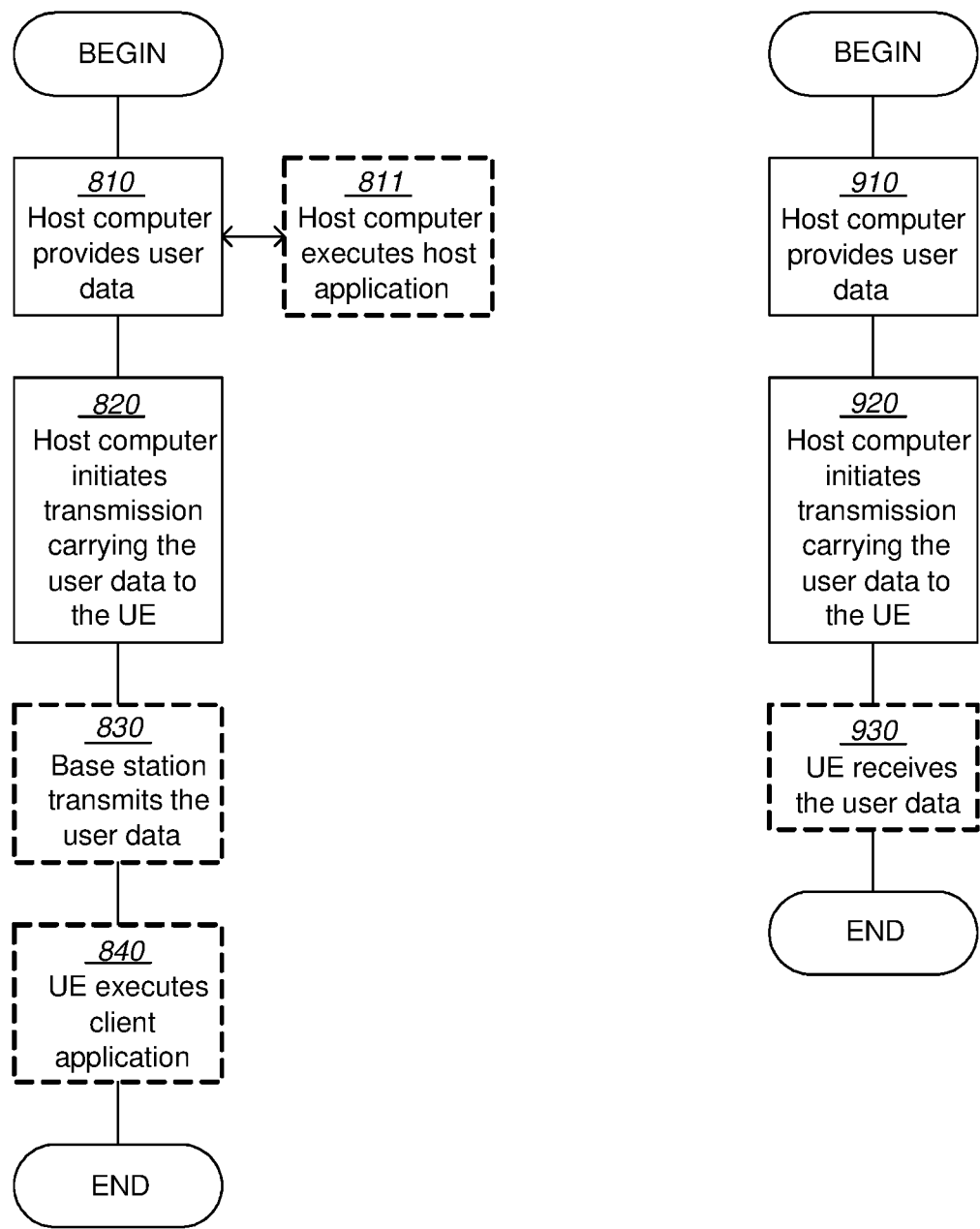
FIGS. 8 and 9 show flowcharts for methods implemented in a communication system including a host computer, a base station or radio device functioning as a gateway and a user equipment.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this paragraph. In a first step 810 of the method, the host computer provides user data. In an optional substep 811 of the first step 810, the host computer provides the user data by executing a host application. In a second step 820, the host computer initiates a transmission carrying the user data to the UE. In an optional third step 830, the base station transmits to the UE the user data which was carried in the transmission that the host computer initiated, in accordance with the teachings of the embodiments described throughout this disclosure. In an optional fourth step 840, the UE executes a client application associated with the host application executed by the host computer.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this paragraph. In a first step 910 of the method, the host computer provides user data. In an optional substep (not shown) the host computer provides the user data by executing a host application. In a second step 920, the host computer initiates a transmission carrying the user data to the UE. The transmission may pass via the base station, in accordance with the teachings of the embodiments described throughout this disclosure. In an optional third step 930, the UE receives the user data carried in the transmission.

The technique may be implemented as a coded system. By way of example, a data packet may comprise a plurality of (e.g., on the order of 1000) coded modulation symbols in any embodiment. Each modulation symbol may result from a combination of multiple (e.g., two, three or more) partial modulation symbols, i.e. each having multiple (e.g., two, three or more) layers.

Furthermore, multi-layer modulation parameters may be selected. The performance of the more robust layers (e.g., the layer associated with the second least power level) can become worse if additional layers are added. Thus, it may be important to not use too many layers. The technique may be implemented to control the parameters of the multi-layer modulation (particularly, the number of layers), e.g., resulting in improved reliability and/or throughput of the data transmission.

As has become apparent from above description, embodiments of the technique allow overcoming the potentially adverse effects on robustness that multi-layer technology may impose for the transmission of low priority messages. Same or further embodiments of the technique enable maintaining different (e.g., varying) levels of QoS between different priorities through combining contention-based (e.g. EDCA-like) medium access schemes with multi-layer technology.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of performing a multi-layer transmission of data on a radio frequency, the multi-layer transmission comprising multiple layers each having a different robustness on the radio frequency, the method comprising:
performing a contention procedure with respect to each of a plurality of access classes, ACs, for accessing the radio frequency; and
performing the multi-layer transmission upon success of the contention procedure of at least one of the ACs, wherein in a transmission opportunity defined by the successful contention procedure data associated with the successful AC is transmitted on a main layer of the multi-layer transmission simultaneously with data associated with at least one further AC on at least one further layer, which is modulated with less robust partial modulation symbols than the main layer of the multi-layer transmission, and
wherein the at least one further AC comprises at least two further ACs that are transmitted on at least two respective further layers of the multi-layer transmission, and wherein a first AC of the at least two further ACs has a first priority and a second AC of the at least two further ACs has a second priority, wherein the first AC is mapped to a first layer of the further layers and the second AC is mapped to a second layer of the further layers, and wherein the first priority is higher than the second priority and the first layer is more robust than the second layer.

2. The method of claim 1, wherein the at least one further AC that is transmitted on the at least one further layer of the multi-layer transmission is randomly selected among the plurality of ACs for which the respective contention procedures are unsuccessful for the transmission opportunity.

3. The method of claim 1, wherein at least two further ACs are transmitted on at least two further layers of the multi-layer transmission, and wherein the at least two further ACs are randomly mapped to the respective further layers.

4. The method of claim 3, wherein the random selection selects a first AC with a first probability that is greater than a second probability for selecting a second AC, and/or wherein a random mapping maps a first AC with a first probability to a given further layer that is greater than a second probability for mapping a second AC to the given further layer.

5. The method of claim 1, wherein the first and second priorities of the at least two further ACs are assigned to the respective further ACs or refined within the respective further AC based on at least one of a layer address and a port number of the data associated with the respective further AC.

6. The method of claim 1, wherein each contention procedure performed for the respective AC is based on a back-off counter, and at least two further ACs are transmitted on at least two respective further layers of the multi-layer transmission, and wherein at least one of the selection and the mapping of the at least two further ACs is based on a comparison of values of the respective back-off counters.

7. The method of claim 1, wherein contention procedures performed with respect to two or more ACs are successful for the same transmission opportunity, and wherein the data associated with the AC having the highest priority among the successful ACs is transmitted on the main layer of the multi-layer transmission.

8. The method of claim 7, wherein the multi-layer transmission comprises n layers, and wherein the respective contention procedures of m ACs based on a back-off counter are successful for the same transmission opportunity, and wherein m>n, the m-n ACs having the least priorities among the n successful ACs reinitiate their contention procedures by randomly drawing a value of the back-off counter from their initial contention window.

9. The method of claim 1, further comprising:
receiving an acknowledgement frame in response to the multi-layer transmission, the acknowledgement frame being indicative of at least two or each of the multiple layers of the multi-layer transmission.

10. The method of claim 9, wherein the acknowledgement frame is indicative of which of the multiple layers of the multi-layer transmission are received successfully.

11. The method of claim 1, wherein a control signal is pending for transmission at the respective station, and wherein the control signal is transmitted on a layer in the multi-layer transmission, and wherein the layer of the multi-layer transmission on which the control signal is transmitted is more robust than the main layer.

12. A computer program product comprising a non-transitory computer readable medium storing program code configured to he executed by a computing device to perform the method of claim 1.

13. A device for performing a multi-layer transmission of data on a radio frequency, the multi-layer transmission comprising multiple layers each having a different robustness on the radio frequency, the device comprising at least one processor and a memory, said memory comprising instructions executable by said at least one processor, whereby the device is operative to:
perform a contention procedure with respect to each of a plurality of access classes, ACs, for accessing the radio frequency; and
perform the multi-layer transmission upon success of the contention procedure of at least one of the ACs, wherein in a transmission opportunity defined by the successful contention procedure data associated with the successful AC is transmitted on a main layer of the multi-layer transmission simultaneously with data associated with at least one further AC on at least one further layer, which is modulated with less robust partial modulation symbols than the main layer of the multi-layer transmission, and
wherein the at least one further AC comprises at least two further ACs that are transmitted on at least two respective further layers of the multi-layer transmission, and wherein a first AC of the at least two further ACs has a first priority and a second AC of the at least two further ACs has a second priority, wherein the first AC is mapped to a first layer of the further layers and the second AC is mapped to a second layer of the further layers, and wherein the first priority is higher than the second priority and the first layer is more robust than the second layer.

14. The device of claim 13, wherein the at least one further AC that is transmitted on the at least one further layer of the multi-layer transmission is randomly selected among the plurality of ACs for which the respective contention procedures are unsuccessful for the transmission opportunity.

15. The device of claim 14, wherein the random selection selects a first AC with a first probability that is greater than a second probability for selecting a second AC, and/or wherein a random mapping maps a first AC with a first probability to a given further layer that is greater than a second probability for mapping a second AC to the given further layer.

16. The device of claim 13, wherein at least two further ACs are transmitted on at least two further layers of the multi-layer transmission, and wherein the at least two further ACs are randomly mapped to the respective further layers.

17. The device of claim 13, wherein the first and second priorities of the at least two further ACs are assigned to the respective further ACs or refined within the respective further AC based on at least one of a layer address and a port number of the data associated with the respective further AC.

18. The device of claim 13, wherein each contention procedure performed for the respective AC is based on a back-off counter, and at least two further ACs are transmitted on at least two respective further layers of the multi-layer transmission, and wherein at least one of the selection and the mapping of the at least two further ACs is based on a comparison of values of the respective back-off counters.

19. The device of claim 13, wherein contention procedures performed with respect to two or more ACs are successful for the same transmission opportunity, and wherein the data associated with the AC having the highest priority among the successful ACs is transmitted on the main layer of the multi-layer transmission.

20. The device of claim 19, wherein the multi-layer transmission comprises n layers, and wherein the respective contention procedures of m ACs based on a back-off counter are successful for the same transmission opportunity, and wherein m>n, the m-n ACs having the least priorities among the n successful ACs reinitiate their contention procedures by randomly drawing a value of the back-off counter from their initial contention window.

21. The device of claim 13, further comprising:
receiving an acknowledgement frame in response to the multi-layer transmission, the acknowledgement frame being indicative of at least two or each of the multiple layers of the multi-layer transmission.

22. The device of claim 21, wherein the acknowledgement frame is indicative of which of the multiple layers of the multi-layer transmission are received successfully.

23. The device of claim 13, wherein a control signal is pending for transmission at the respective station, and wherein the control signal is transmitted on a layer in the multi-layer transmission, and wherein the layer of the multi-layer transmission on which the control signal is transmitted is more robust than the main layer.

24. A communication system including a host computer comprising:
processing circuitry configured to provide user data; and
a communication interface configured to forward user data to a cellular or ad hoc radio network for transmission to a user equipment, UE, wherein the UE comprises a radio interface and processing circuitry, the processing circuitry of the UE being configured to perform operations comprising:
performing a contention procedure with respect to each of a plurality of access classes, ACs, for accessing the radio frequency; and
performing the multi-layer transmission upon success of the contention procedure of at least one of the ACs, wherein in a transmission opportunity defined by the successful contention procedure data associated with the successful AC is transmitted on a main layer of the multi-layer transmission simultaneously with data associated with at least one further AC on at least one further layer, which is modulated with less robust partial modulation symbols than the main layer of the multi-layer transmission, and
wherein the at least one further AC comprises at least two further ACs that are transmitted on at least two respective further layers of the multi-layer transmission, and wherein a first AC of the at least two further ACs has a first priority and a second AC of the at least two further ACs has a second priority, wherein the first AC is mapped to a first layer of the further layers and the second AC is mapped to a second layer of the further layers, and wherein the first priority is higher than the second priority and the first layer is more robust than the second layer.

* * * * *